US012627502B2

(12) United States Patent
Vinjamuri et al.

(10) Patent No.: US 12,627,502 B2
(45) Date of Patent: May 12, 2026

(54) ACHIEVING HIGH SSL/TLS THROUGHPUT IN EMBEDDED DEVICES

(71) Applicant: Silicon Laboratories Inc., Austin, TX (US)

(72) Inventors: Venkatesh Vinjamuri, Andhra Pradesh (IN); Subba Reddy Kallam, Austin, TX (US); Atul Suresh Joshi, Maharashtra (IN); Venkata Siva Prasad Pulagam, Telangana (IN); Satish Nallamalla, Telangana (IN); Rahul Kumar Gurram, Telangana (IN)

(73) Assignee: Silicon Laboratories Inc., Austin, TX (US)

( * ) Notice: Subject to any disclaimer, the term of this patent is extended or adjusted under 35 U.S.C. 154(b) by 97 days.

(21) Appl. No.: 18/519,952

(22) Filed: Nov. 27, 2023

(65) Prior Publication Data

US 2025/0175343 A1 May 29, 2025

(51) Int. Cl.
*H04L 9/32* (2006.01)
*H04L 9/06* (2006.01)

(52) U.S. Cl.
CPC .......... *H04L 9/3242* (2013.01); *H04L 9/0643* (2013.01); *H04L 9/3239* (2013.01); *H04L 2209/20* (2013.01)

(58) Field of Classification Search
None
See application file for complete search history.

(56) References Cited

U.S. PATENT DOCUMENTS

2002/0191790 A1* 12/2002 Anand .................. H04L 9/0643
380/255
2002/0191793 A1* 12/2002 Anand ................ H04L 63/0485
380/255

(Continued)

FOREIGN PATENT DOCUMENTS

CN          115525887 A  * 12/2022  ............. G06F 21/44
WO      WO-0060820 A2  * 10/2000  .......... G11B 27/322
WO   WO-2011034456 A1 *   3/2011  ........... H04L 9/0643

OTHER PUBLICATIONS

Juhyeng Han, Seongmin Kim, Daeyang Cho, Byungkwon Choi, Jaehyeong Ha and Dongsu Han (A Secure Middlebox Framework for Enabling Visibility Over Multiple Encryption Protocols); p. 14; Published in Dec. 6 (Year: 2020).*

(Continued)

*Primary Examiner* — Ali H. Cheema
(74) *Attorney, Agent, or Firm* — Zagorin Cave LLP

(57) ABSTRACT

An embedded system includes hash message authentication code (HMAC) hardware. The HMAC hardware receives data in separate data transfers to compute a hash. The HMAC hardware receives data of unaligned lengths in at least one of the separate data transfers. The data of unaligned lengths includes fewer valid bytes than the transfer size. The HMAC hardware responds to a residue indication indicating valid bytes associated with the data transfer to fill in the residue from a subsequent data transfer. For each data transfer the HMAC hardware receives an indication of whether the data is final data or if more data will be transferred for computation of the hash. The embedded system loads a linear buffer directly from scatter buffers, which contain encrypted data from a network. Decrypted data in the linear buffer is sent to a host using a direct memory access (DMA) operation responsive to a host request.

14 Claims, 7 Drawing Sheets

(56) References Cited

U.S. PATENT DOCUMENTS

| | | | | |
|---|---|---|---|---|
| 2006/0095654 | A1* | 5/2006 | Miller | G11C 15/00 |
| | | | | 711/216 |
| 2006/0203807 | A1* | 9/2006 | Kouretas | H04L 41/5087 |
| | | | | 370/352 |
| 2008/0037955 | A1* | 2/2008 | Morimoto | H04N 9/8042 |
| | | | | 386/326 |
| 2009/0210707 | A1* | 8/2009 | De Lutiis | H04L 63/123 |
| | | | | 713/170 |
| 2011/0145683 | A1* | 6/2011 | Gopal | G06F 9/30145 |
| | | | | 714/781 |
| 2011/0302418 | A1* | 12/2011 | Fujisaki | H04L 9/0643 |
| | | | | 713/179 |
| 2013/0083848 | A1* | 4/2013 | Joch | H04N 19/40 |
| | | | | 375/E7.198 |
| 2014/0064483 | A1* | 3/2014 | Fujisaki | H04L 9/0643 |
| | | | | 380/44 |
| 2014/0095412 | A1* | 4/2014 | Agashe | G06F 16/35 |
| | | | | 706/46 |
| 2017/0322936 | A1* | 11/2017 | Davis | G06F 16/2455 |
| 2018/0091483 | A1* | 3/2018 | Eiriksson | G06F 21/602 |
| 2019/0146712 | A1* | 5/2019 | Lee | G06F 12/0246 |
| | | | | 711/103 |
| 2023/0077946 | A1* | 3/2023 | Kreimer | H04L 9/0618 |
| | | | | 723/189 |
| 2023/0102726 | A1* | 3/2023 | Collins | G06Q 20/3823 |
| | | | | 713/193 |
| 2023/0161667 | A1* | 5/2023 | Choi | G06F 11/1068 |
| | | | | 714/764 |
| 2024/0314141 | A1* | 9/2024 | Nanivadekar | H04L 63/1416 |

OTHER PUBLICATIONS

Silicon Laboratories Inc., "SiWG917 SoC Single Chip Wi-Fi® 6 and Bluetooth® LE 5.4 Wireless Secure MCU Solutions Data Short," downloaded from silabs.com on Oct. 19, 2023, 11 pages.

* cited by examiner

SSL Receive Packet Flow (Old Architecture)

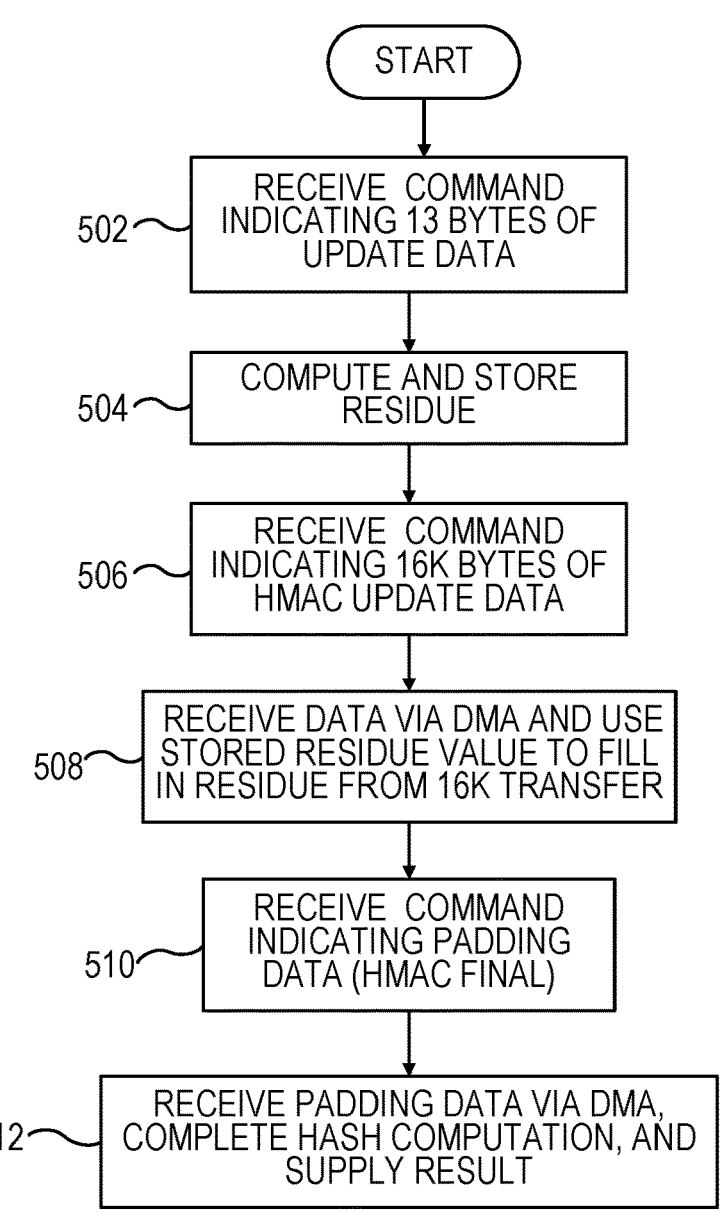

502 — RECEIVE COMMAND INDICATING 13 BYTES OF UPDATE DATA

504 — COMPUTE AND STORE RESIDUE

506 — RECEIVE COMMAND INDICATING 16K BYTES OF HMAC UPDATE DATA

508 — RECEIVE DATA VIA DMA AND USE STORED RESIDUE VALUE TO FILL IN RESIDUE FROM 16K TRANSFER

510 — RECEIVE COMMAND INDICATING PADDING DATA (HMAC FINAL)

512 — RECEIVE PADDING DATA VIA DMA, COMPLETE HASH COMPUTATION, AND SUPPLY RESULT

Fig. 5

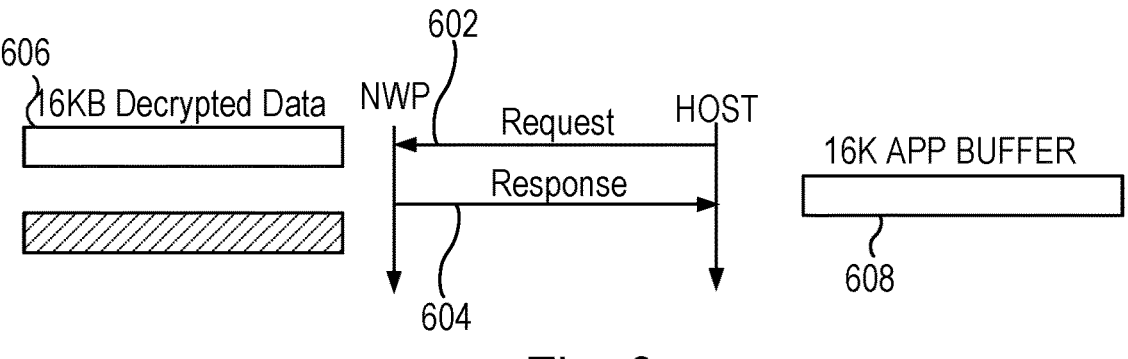

606 16KB Decrypted Data

602 NWP    Request    HOST

Response

604

16K APP BUFFER

| Use case | Without Enhancements | With Enhancements | % of improvement |
|---|---|---|---|
| SSL Rx asynchronous (16KB record) | ~13Mbps | ~20Mbps | ~53 |
| SSL Rx synchronous (16KB record) | ~3Mbps | ~13Mbps | ~333 |

Fig. 8

ACHIEVING HIGH SSL/TLS THROUGHPUT IN EMBEDDED DEVICES

BACKGROUND

Field of the Invention

This disclosure relates to throughput on secure sockets layer/transport layer security (SSL/TLS) in embedded devices.

Description of the Related Art

There are increasing demands for secure communication in today's world. To address those demands, it is desirable to ensure high (SSL/TLS) throughput. SSL/TLS provides for secure network communications by encrypting the communications for transport over the network. The data is then decrypted for use by the receiving device.

FIG. 1 illustrates a prior art approach for the receive flow in a portion of an embedded device receiving SSL/TLS data. The SSL/TLS layer requests data from the transmission control protocol/internet protocol (TCP/IP) layer and receives the data from the TCP/IP layer responsive to the request. The TCP/IP layer includes the TCP scatter buffers 102. A common TCP payload size is 1460 bytes. A larger SSL/TLS record, e.g., 16 kilobytes (KB), can be broken up into transfers of smaller portions of 1460 bytes each. The scatter buffers 102 are sized to contain 512 bytes of data. A 1460 byte payload along with the required packet and header information requires four scatter buffers. Assume that the SSL layer requests a record sized at 16 KB. The TCP scatter buffers 102 receive multiple 1460 byte payloads and transfer the 1460 bytes to an intermediate linear hold buffer 104 responsive to the request. Once the complete TCP payload of 1460 bytes is copied from the four scatter buffers 102 to the linear intermediate hold buffer 104, the four scatter buffers are freed at the same time. Once the intermediate linear hold buffer is filled, e.g., with 1460 bytes of the requested data, a memory copy operation transfers the contents of the intermediate linear hold buffer to the 16 KB linear buffer 106, which is sized to accommodate a 16 KB payload. The SSL/TLS layer read request length may not be equivalent to the length of the TCP packet received. For example, the read request may be for less data than contained in the TCP packet received. So, a portion of the data that is in the intermediate linear hold buffer that is not part of the SSL/TLS request is stored in the intermediate linear buffer 104 in the SSL layer to satisfy a future SSL/TLS layer request.

Once the 16 KB linear buffer has received the encrypted data transmitted over the network, decryption logic 107 receives encrypted data stored in the 16 KB linear buffer 106, decrypts the data, and the decrypted data is then stored back into the 16 KB linear buffer 106. In addition, a message authentication process occurs as described further herein. Once the record is decrypted, the record is available for the host 110. FIG. 2 illustrates a prior art approach to transferring the data from the 16 KB linear buffer 106 to the host 110. In the approach illustrated in FIG. 2, transferring a 16 KB size SSL/TLS record requires 12 requests-responses (request from the host, response from the SSL/TLS layer in the Networking Processor (NWP) as the maximum packet size that can be transferred to the host is limited to 1460 bytes in the embodiment illustrated in FIGS. 1 and 2. Those 1460 bytes are stored in the host scatter buffers 108 shown in FIG. 1. In order to transfer one 16 KB record, 1460 bytes of data is copied into the scatter buffers 108 from the 16 KB linear buffer 106 responsive to each host request and then transferred to the host from the scatter buffers 108. That approach not only requires multiple (12) request-responses but also requires additional memory for creating the host scatter buffers 108. FIG. 2 shows the 16 KB linear buffer 106 starts with 16 KB of decrypted data and after 12 requests-responses the entire 16 KB record has been transferred through the scatter buffers 108 to the host 110. The hatched portion in FIG. 2 illustrates the cumulative amount of data that has been transferred.

Referring back to FIG. 1, the HMAC (hash-based message authentication code) SHA (Secure Hash Algorithm) hardware 109 shown in FIG. 1 requires data be sent on aligned four byte boundaries and supports only a one-shot input meaning that data cannot be transferred in multiple transfers. Thus, all data sent for a particular HMAC SHA hardware operation must be aligned on four-byte boundaries and must be sent in one shot. Considering an SSL record size of 16 KB, before computing the hash on the given data, HMAC computations can require data be prepended and also require padding data to properly account for the required block size. Thus, 13 bytes of HMAC inner data is prepended to the record and the data must be padded if the given data is not a multiple of the HMAC block size. With HMAC hardware supporting only single shot mode, that requires a second linear buffer to be allocated sized at (13 bytes+record size+padding data) and the (13 bytes+record size+padding data) must be memory copied into the second linear buffer.

SUMMARY OF EMBODIMENTS OF THE INVENTION

In order to provide enhanced SSL/TLS throughput an embodiment provides a method that includes receiving first data at a hash message authentication code (HMAC) hardware at a first time in a first data transfer. The method further includes receiving second data at the HMAC hardware at a second time in a second data transfer that is separate from the first data transfer and receiving third data at the HMAC hardware accelerator at a third time in a third data transfer that is separate from the first data transfer and the second data transfer. The HMAC hardware performs a hash operation using the first data, the second data, and the third data.

In another embodiment an apparatus includes a hash message authentication code (HMAC) hardware and the HMAC hardware is configured to receive data in separate data transfers to perform a hash operation.

In another embodiment a system comprises a hash message authentication code (HMAC) hardware. The HMAC hardware is configured to receive data in separate data transfers to compute a hash for message authentication. The HMAC hardware is configured to receive data of unaligned lengths, the data of unaligned lengths being in at least one of the separate data transfers. The data of unaligned lengths includes a first number of bytes of valid data in a transfer having a second number of bytes, the second number of bytes being greater than the first number of bytes. The HMAC hardware is responsive to an indication of a residue associated with the data of unaligned lengths to fill in the residue from a subsequent data transfer; and wherein for each of the separate data transfers the HMAC hardware receives an indication of whether the data is a final data transfer for computation of the hash or if more data is to be transferred after the current data for computation of the hash.

BRIEF DESCRIPTION OF THE DRAWINGS

The present invention may be better understood, and its numerous objects, features, and advantages made apparent to those skilled in the art by referencing the accompanying drawings.

FIG. 5 illustrates a flow diagram showing the operation of the HMAC SHA hardware.

FIG. 6 shows the request-response approach utilizing an embodiment with 16 KB transfer capability responsive to a single request.

FIG. 8 is a table showing the improvements in reception for 16 KB SSL/TLS records.

The use of the same reference symbols in different drawings indicates similar or identical items.

DETAILED DESCRIPTION

Figure 1:
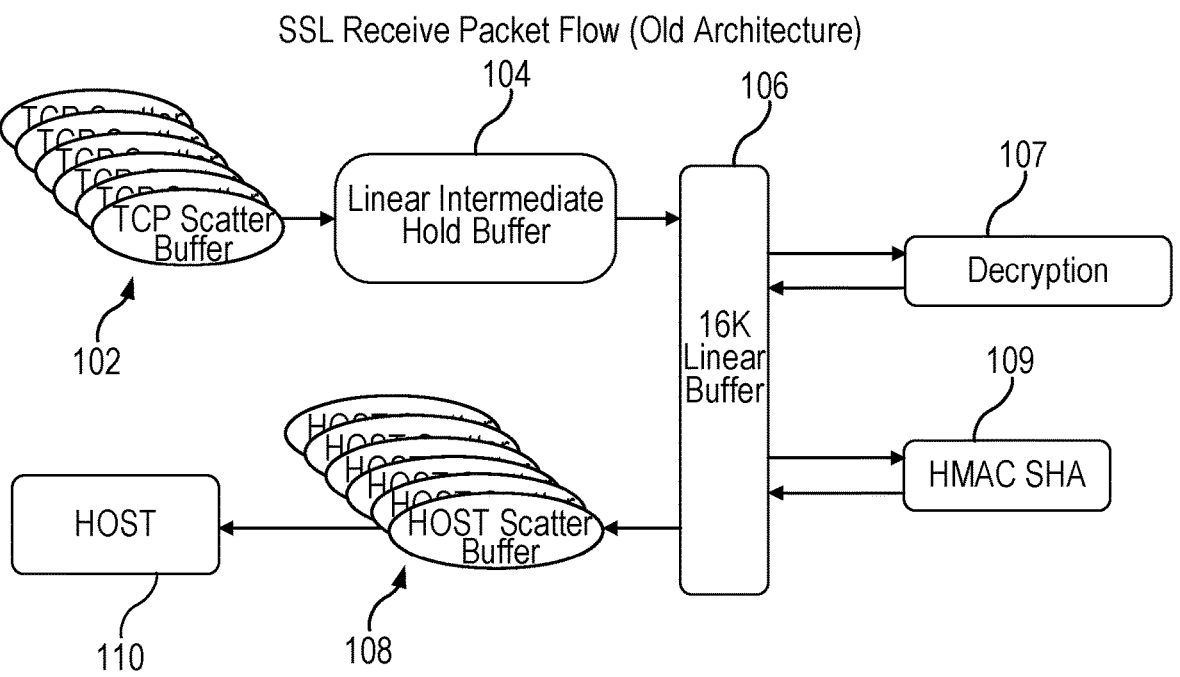
FIG. 1 shows a prior art receive packet flow diagram.
Figure 2:
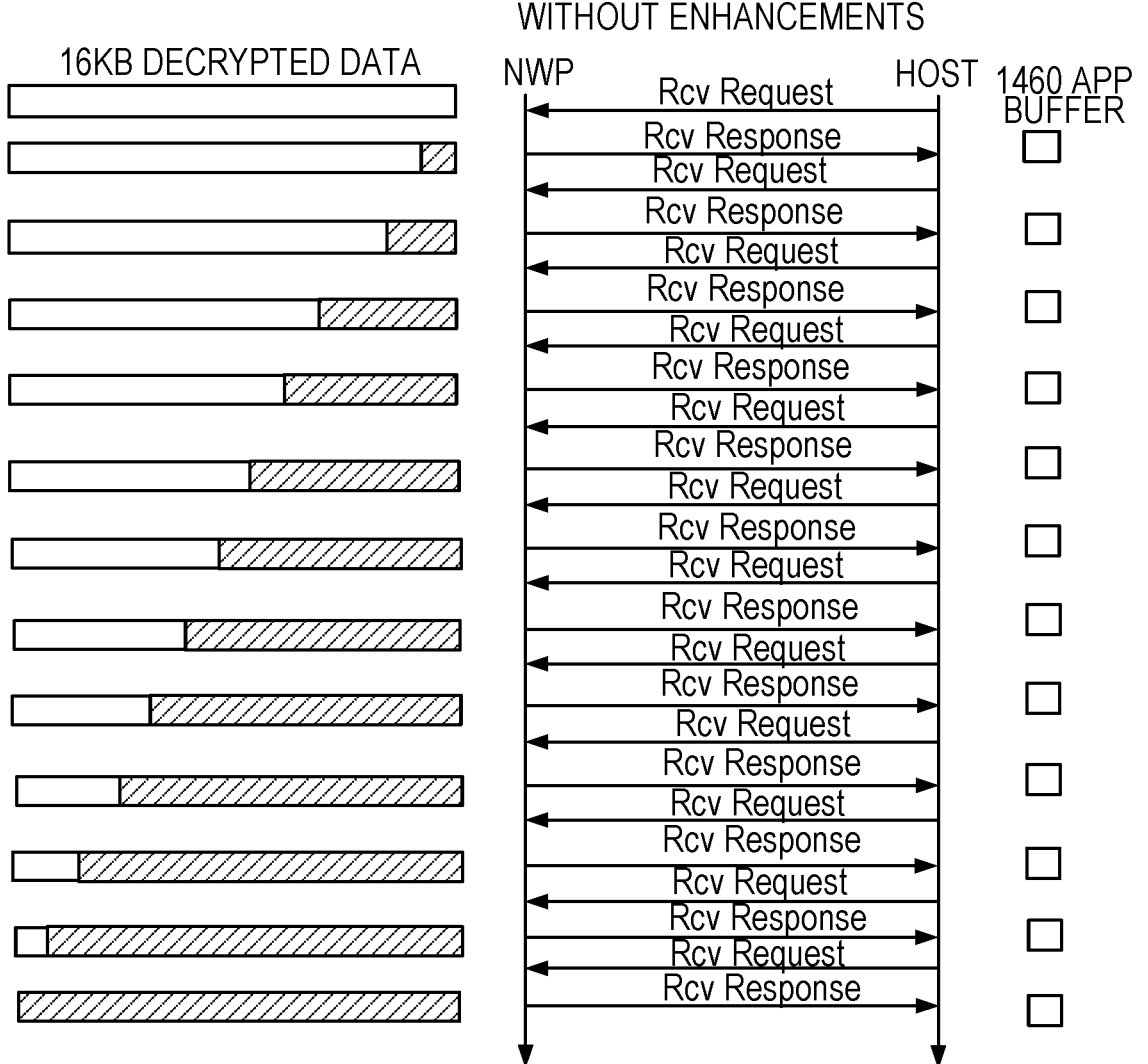
FIG. 2 illustrates multiple request-response pairs transferring data in each response in order to transfer 16 KB of data to the host.

Embodiments herein improve on the system illustrated in FIGS. 1 and 2 to provide higher SSL/TLS throughput. High SSL/TLS throughput provides a number of benefits for embedded devices. One benefit is improved user experience. Users expect fast and responsive applications. If an application has slow SSL/TLS performance, that can lead to a poor user experience and frustration for end-users. Another benefit of high SSL throughput is improved security. Since SSL/TLS is used to secure data transmissions over the network, SSL/TLS is critical to the security of many applications. However, SSL/TLS processing can be CPU-intensive and slow down the application, which can lead to lower security if the SSL/TLS processing is skipped or reduced. Therefore, high SSL/TLS throughput helps maintain a high level of security. Achieving high SSL/TLS throughput allows devices to perform SSL/TLS operations more quickly and reduces the amount of time that the central processing unit (CPU) and related circuitry needs to be active, which can enhance energy efficiency by reducing power consumption and thereby prolonging battery life.

Embodiments described herein utilize multiple enhancements to speed up SSL/TLS throughput. A first enhancement avoids the intermediate linear hold buffer 104 shown in FIG. 1. A second enhancement provides more flexible HMAC SHA hardware. A third enhancement eliminates the need for multiple transfers from the 16 KB linear buffer 106 to the host 110 saving time and memory resources, particularly for large transfers.

Figures 3, 4:
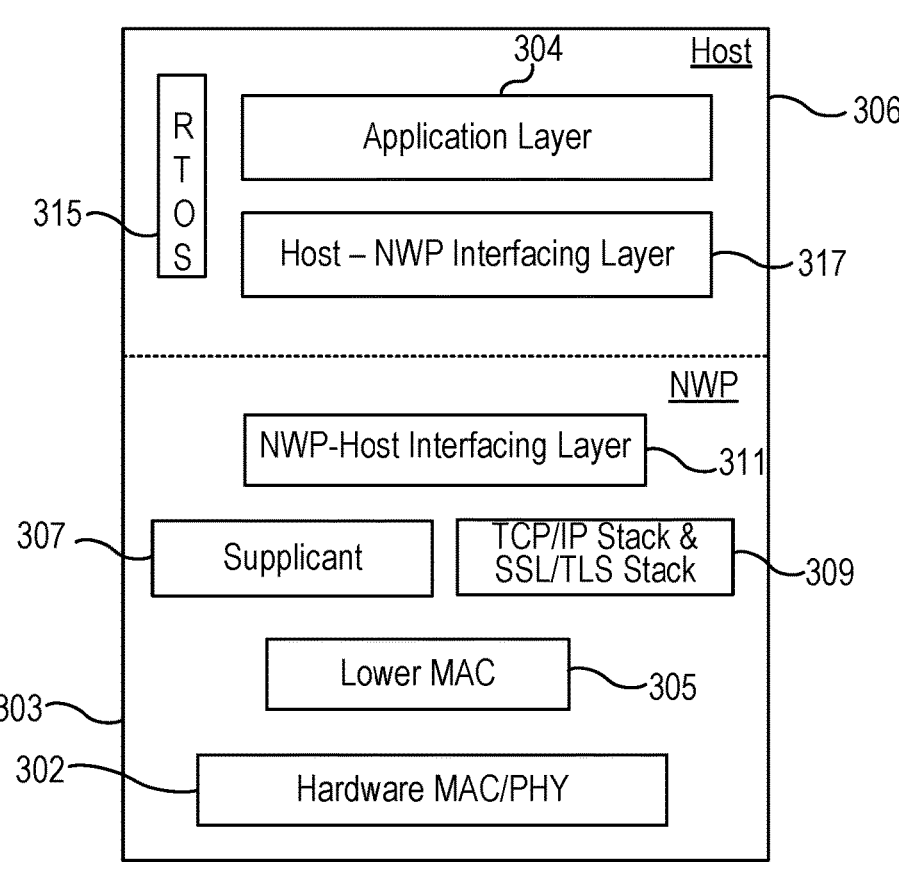
FIG. 3 illustrates a high level system diagram showing various system layers.
FIG. 4 illustrates a block diagram of an embodiment with improved SSL/TLS throughput.

FIG. 3 illustrates a high-level system diagram showing various system layers. In a receive operation the data flows from the bottom layer 302 in the Networking Processor (NWP) 303 to the top layer 304 in the host 306. For a transmit operation, the flow is the opposite. The bottom layer includes the hardware for the Physical (PHY) layer, which implements the physical and electrical requirements of the network. It is responsible for managing the hardware that modulates and demodulates the radio frequency (RF) transmissions. The Media Access Control (MAC) layer is responsible for sending and receiving RF frames over the air. The layer above is the Lower Media Access Control (LMAC) layer 305, which provides software for interacting with hardware. Next layer is the Supplicant 307, which gets access and maintains the wireless connection with an Access point. The layer above includes TCP/IP Stack and SSL/TLS layer 309. The TCP/IP stack is a suite of communication protocols used to interconnect network devices on the internet or in a private computer network (an intranet or extranet). The SSL/TLS layer is a protocol or communication rule that allows devices to communicate on the internet safely. The NWP-Host interfacing layer 311 in the NWP 303 acts as a connecting interface to the Host from the NWP. The Real Time Operating System (RTOS) 315 runs in the Host. Host-NWP interfacing layer 317 acts as a connecting interface from the Host to the NWP. The topmost Application layer 304 provides the functionality to be performed in the embedded system. The SSL/TLS layer 309 is the focus of the improvements described herein.

FIG. 4 illustrates an embodiment that avoids the use of the intermediate linear hold buffer 104 shown in FIG. 1. Data from the scatter buffers 102 is written directly into the linear buffer 106 without utilizing the intermediate linear hold buffer 104. The control logic 401 transfers data in accordance with the request from the SSL layer. The control logic 401 maintains the proper pointers into the 16 KB linear buffer and the TCP scatter buffers 102 and ensures that the transfers continue from the TCP scatter buffers into the 16 KB linear buffers until the request has been fulfilled. For example, the SSL/TLS layer request may be for a 16 KB record or less than a 16 KB record. As four scatter buffers (4×512 bytes) are required to hold a 1460 byte payload, not all the bytes in the scatter buffers are used and the control logic 401 ensures the appropriate scatter buffer locations are transferred to the linear buffer 106 to fulfill the request. Once the contents of the scatter buffers for a particular TCP packet have been consumed by the 16 KB linear buffer 106, the control logic frees the scatter buffers. The scatter buffers may not be freed if fulfilling the SSL request leaves valid data in the scatter buffers that are not part of the request. Thus, the scatter buffer may hold that data until it is needed to fulfill another request by the SSL layer. Hold scatter buffer 403 represents that situation. Writing directly from the TCP scatter buffers 102 into the 16 KB linear buffer 106 saves the time required for memory copy operations due to the elimination of the intermediate linear hold buffer 104 and saves memory by eliminating the need to allocate memory for the intermediate linear hold buffer 104 shown in FIG. 1. The control logic 401 while shown as a separate entity in FIG. 4 can be implemented as code and/or microcode running on processor 404, which can be implemented as a microcontroller unit (MCU), as digital logic including state machines, as a separate memory management unit, or as any software and hardware combination that tracks the SSL/TLS request, effects the transfer of data into the 16 KB linear buffer 106 from the TCP scatter buffers 102, frees the scatter buffers when possible, and ensures the data is written sequentially into the 16 KB linear buffer 106 responsive to the SSL/TLS data request.

A second enhancement involves more efficient use of security hardware, specifically HMAC (hash-based message authentication code) SHA (Secure Hash Algorithm) hardware 402 (referred to herein as HMAC hardware for ease of reference), shown in FIG. 4. HMAC hardware provides message authentication using a hash algorithm. The hash algorithm is a cryptographic operation that can consume a lot of time when implemented in software. To avoid that time consuming operation, the HMAC hardware 402 is implemented as a hardware accelerator. After decryption, the message authentication assures the recipient of the authenticity of the message by obtaining the correct hash. Thus, HMAC hardware 402 can be used to check SSL/TLS data for data integrity and to authenticate the parties involved in a transaction. That prevents, e.g., a man in the middle attack, where data is changed in the SSL/TLS record before it arrives at the destination.

As pointed out above, a prior implementation of HMAC hardware 109 in FIG. 1 described above requires that data be sent on aligned four-byte boundaries and supports only one-shot input meaning that data cannot be transferred in multiple transfers. That is, the HMAC expects the data for the hash operation to be provided without interruption. To improve on that implementation, an embodiment of HMAC hardware 402 is configured to support multi-input. That is, all inputs do not have to come in one data transfer operation. An embodiment of multi-input identifies different types of inputs to the HMAC hardware. One type of input is HMAC Update, which indicates to the HMAC hardware that more data will be transferred to the HMAC hardware following the current data. Another kind of input is HMAC final, which indicates to the HMAC hardware that the current data transferred is the last data. In an embodiment a hardware register in the HMAC is programmed to indicate that the data is final data, which triggers computing the hash. That identification can be, e.g., in a command field associated with the data transfer sent to the HMAC hardware from a processor 404, in a control signal line supplied to the HMAC hardware 402, or using any other another suitable mechanism to inform the HMAC hardware either that more data will follow that is to be used to generate the hash or that the data is final and the current data transfer to the HMAC hardware is the last data transfer required for hash generation. To still support single shot mode in multi-input capable HMAC hardware, the initial data transfer is indicated as an HMAC Final transfer and all the data is transferred in one shot.

In addition to supporting multi-input instead of single shot mode, embodiments of the HMAC hardware 402 support unaligned lengths of data while using direct memory access (DMA). If the input is in unaligned bytes, then the HMAC hardware calculates the residue bytes that need to be filled and fills the data appropriately from the next data input. For example, in embodiments in which data lengths that can be transferred via DMA to the HMAC hardware is limited to 4 bytes of aligned data, when 13 bytes of data is programmed to be transferred for a required prepend to the 16 KB data record, the residue will be 3 bytes as the aligned length for the DMA will be 16 bytes (4×4 bytes to accommodate the 13 bytes). The HMAC hardware fills the residue bytes from the next DMA data input. The HMAC hardware receives a notification of the transfer size and the number of valid bytes. That notification can be in a command field or other notification sent from the processor 404 that utilizes the HMAC hardware as an accelerator. In an embodiment HMAC hardware registers are programmed for each transaction indicating the actual length of valid data for the bytes that are received in the DMA.

FIG. 5 illustrates a flow diagram showing the operation of the HMAC hardware 402 for an exemplary hash operation in which the HMAC hardware supports both multi-input and unaligned lengths. In 502 the HMAC hardware 402 receives a command from the associated processor requesting a hash operation. In addition, the command indicates 13 bytes of HMAC inner data forming the prepend and required by the SHA is going to be supplied as HMAC Update data (indicating more data is coming). The HMAC hardware computes and stores an indication of the residue (here three bytes) in 504. Since a minimum of 16 bytes is transferred, assuming DMA is limited to four-byte increments, transferring only 13 bytes of valid data results in a residue of 3 bytes. Then in 506 the HMAC hardware receives a command indicating a DMA transfer of a 16 KB record from the 16 KB linear buffer 106 directly to the HMAC hardware. The HMAC starts processing based on the block size. If sufficient data has not been received, e.g., just 13 valid bytes, the HMAC retains that data waiting for additional data to be received to form a complete block. The HMAC hardware also receives an HMAC Update indication associated with the 16 KB record again indicating that more data is to come in order to complete computation of the hash. In 508, the HMAC uses the stored residue information to fill in the residue data from the 16 KB transfer. Since the previous update had a residue of 3 bytes, although the current 16 KB transfer is aligned to 4 bytes, since the residue gets filled first, at the end of the 16 KB transfer there remains a residue of 3 bytes. Padding is done in such a way that the final data includes enough bytes to account for any remaining residue to form blocks of the appropriate block size for the HMAC. In 510 required padding data is supplied to the HMAC hardware via a DMA transfer along with an HMAC Final indication (indicating this is the last data). The HMAC hardware completes computation of the hash in 512 and supplies the hash to the processor 404 or stores the result in an appropriate memory location such as a temporary buffer for comparison with the expected hash. Support for multi-input and data of unaligned lengths avoids the need for memory copy into a duplicative memory prior to transferring data to the HMAC hardware. Note that implementations of HMAC hardware to compute a desired hash, e.g., SHA-256 or SHA-512, are well known in the art and accordingly are not being described herein other than the capability to handle non-aligned byte transfers and multi-input as described, e.g., in FIG. 5.

A third enhancement improves transfer speed of a 16 KB size SSL/TLS record from the 16 KB linear buffer 106 to the host 110. In an embodiment illustrated in FIGS. 4 and 6, a complete record up to a maximum size of 16 KB can be transferred to the host 110 with a single read request from the host application. Assuming the host application has enough memory, as shown in FIG. 6 the host sends the read request 602 of maximum length 16 KB and firmware running in the NWP uses DMA to send the decrypted contents 606 of the linear buffer 106 directly to 16 KB application buffer 608 of the host 110. The linear buffer 106 is freed upon completion of the 16 KB data transfer. Thus, transferring the complete 16 KB record 606 from the 16 KB linear buffer to the 16 KB application buffer with a single request-response improves the throughput by reducing the number of host interactions as compared to the multiple request-responses shown in FIG. 2 and also eliminates the need for allocating memory for host scatter buffers 108 shown in FIG. 1.

Figure 7:
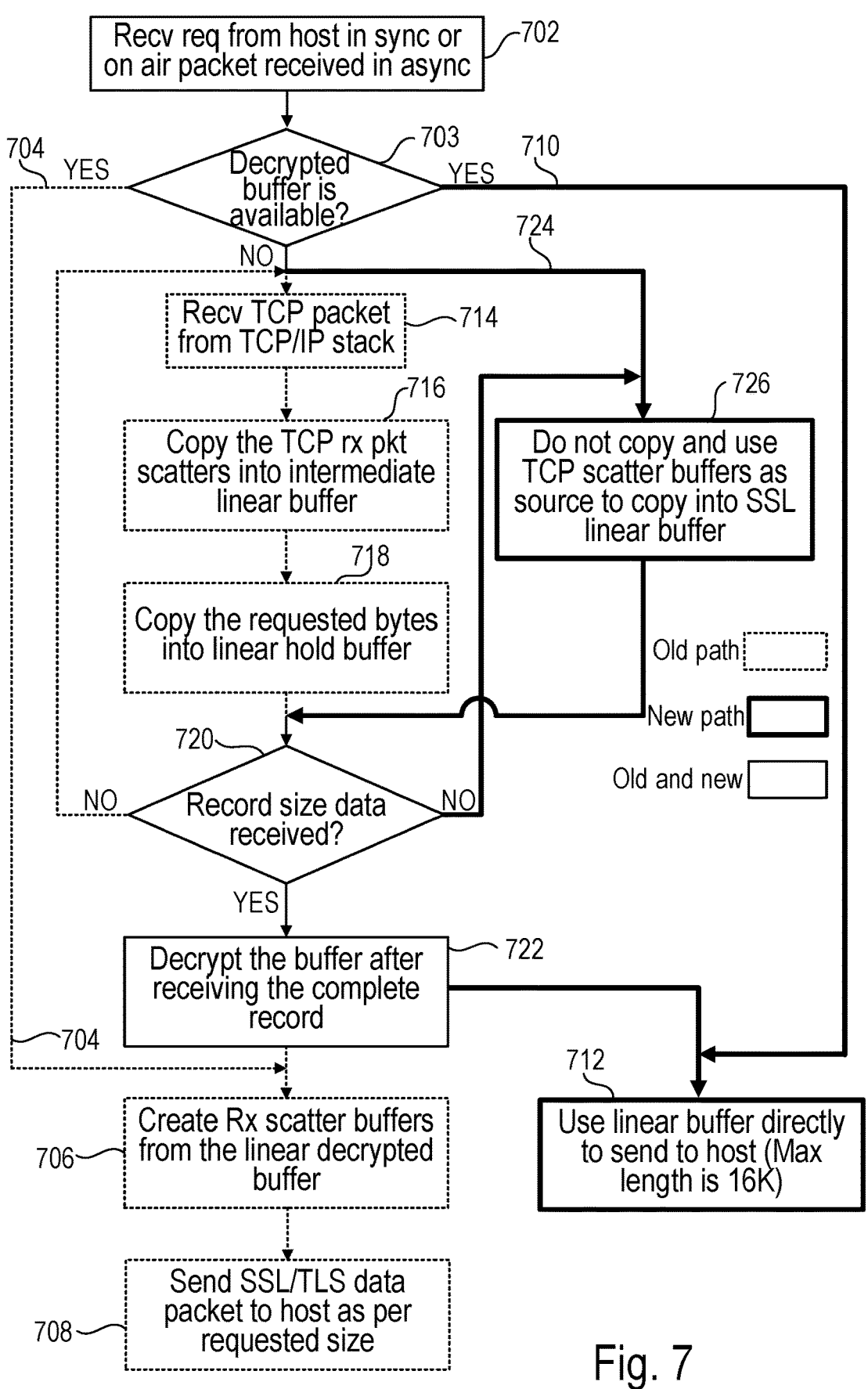
FIG. 7 is a flow diagram illustrating the differences between the old architecture and the new architecture.

FIG. 7 is a flow diagram illustrating the differences between the old architecture illustrated in FIGS. 1 and 2 and the new architecture shown in FIGS. 4-6. The new architecture flow is indicated by solid lines and the old architecture flow is indicated by dotted lines. In 702, the host requests data from the SSL/TLS layer. If a decrypted buffer is available in 703 in the old architecture the path 704 is taken, scatter buffers are created in 706, and data is sent to the host in 708 using the scatter buffers with any single transfer being limited to 1460 bytes. In the new architecture, if a decrypted data is already available, the path 710 is taken and data is transferred in 712 to the host in a single request-response with the DMA transfer size being up to a maximum size of 16 KB although different maximum sizes can be used in other embodiments. If decrypted data is not available in 703, in the old architecture in 714 the TCP packet is received from the TCP/IP stack into the scatter buffers. In 716 the contents of the scatter buffers are copied into the intermediate linear hold buffer in 718. In 720, if the requested record size has been received, the data in the buffer is decrypted in 722. If the complete record has not been received the flow returns to 714 and the process is repeated until the requested record is available for decryption. In the old architecture, once decryption is finished the flow proceeds to 706 as described above. In the new architecture, if the decrypted data is not available in 703, the path 724 is taken and the scatter buffers are copied directly into the 16 KB linear buffer in 726. The flow then proceeds to 720 to determine if the data corresponding to the record size has been received. If not, the flow returns to 726 and the transfer into the linear buffer is repeated until all data has been received. If all the data has been received the flow proceeds to decrypt the buffer in 722. In the new architecture once decryption is completed the flow proceeds to 712, which is described above.

Utilizing embodiment with enhancements described herein saves both memory and time thus improving the SSL/TLS throughput, which helps provide an improved user experience and power savings. The table shown in FIG. 8 shows the improvements for reception of both asynchronous and synchronous 16 KB SSL/TLS records. For synchronous reception, data is sent to the host responsive to a read request from the host. In a synchronous transmission the NWP waits for a request from the host and then sends the data to host. An asynchronous receive does not need a read request from host. Instead, whenever a decrypted buffer is available data is sent immediately to the host.

Figure 9:
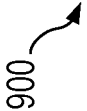
FIG. 9 illustrates a high level block diagram of a device 900 incorporating high SSL/TLS throughput enhancements.

FIG. 9 illustrates a high level block diagram of an embodiment of an embedded device 900 that incorporates the high throughput enhancements described above. The device 900 includes wireless modem circuits 902, providing wirelesss communication capabilities for one or more wireless standards including IEEE 802.11 and Bluetooth® Low Energy (BLE) at various frequencies such as 2.4 GHz and 5.4 GHz. A networking processor 904 (corresponding to NWP 303) and associated memory 906 store code providing support and control for transmit and receive functions for one or more of the various wireless protocols supported by the wireless modem circuits 902. The device 900 includes a security block 908 that includes, e.g., the HMAC hardware 402, encryption and decryption logic 107, and other security related functions not illustrated. The device 900 further includes a processor 910 and associated memory 912 to provide programming capability for application programs and other functionality of the embedded device 900. The processor includes a central processing unit (CPU) 914, a floating point unit (FPU) 915 and other functionality, e.g., memory management, not specifically illustrated. Note that the memory 906 and 912 includes, e.g., cache memory integrated onto the processor integrated circuit, read only memory (ROM), non-volatile memory (NVM) such as flash memory, and static random access memory (SRAM). In addition to the blocks shown, the embedded device further includes peripheral block 916 to provide such functions as timing, memory control, analog to digital (A/D) converters, digital to analog converts (DACs), and various communication interfaces such as serial input/output (I/O). The device further includes a power management unit 918 to reduce power consumption where possible and extend battery life. In embodiments, the embedded device 900 further includes a host microcontroller unit (MCU) 922 that includes the CPU 924 and memory 926 that provides host functionality described herein. Of course, various embodiments can include additional or fewer capabilities. In addition, the functionality of the individual blocks in device 900, while shown separately, may be incorporated into one or more of the other illustrated blocks or integrated with other functionality not illustrated. The various blocks communicate on an interconnect 920. Of course, other interconnects may provide for direct communication between certain blocks or functionality within blocks. The various blocks illustrated in FIG. 9 implement the layers shown in FIG. 3 and the functionality described for high SSL/TLS throughput.

Thus, embodiments with various enhancements to achieve high SSL/TLS throughput have been described. The description of the invention set forth herein is illustrative and is not intended to limit the scope of the invention as set forth in the following claims. The terms such as "first" and "second", as used in the claims, unless otherwise clear by context, are used to distinguish between different items in the claims and do not otherwise indicate or imply any order in time, location, or quality. Other variations and modifications of the embodiments disclosed herein, may be made based on the description set forth herein, without departing from the scope of the invention as set forth in the following claims.

What is claimed is:

1. A method comprising:

receiving first data at a hash message authentication code (HMAC) hardware at a first time in a first data transfer, wherein the first data is received as data of unaligned lengths, the data of unaligned lengths being smaller than a number of bytes supplied to the HMAC hardware in the first data transfer;

identifying to the HMAC hardware a number of unused bytes in the first data transfer, the unused bytes constituting a residue;

receiving second data at the HMAC hardware at a second time in a second data transfer that is separate from the first data transfer;

filling in, by the HMAC hardware, the residue from the second data transfer subsequent to the first data transfer;

receiving third data at the HMAC hardware at a third time in a third data transfer that is separate from the first data transfer and the second data transfer; and performing a hash operation in the HMAC hardware using the first data, the second data, and the third data.

2. The method as recited in claim 1, further comprising:

indicating that the first data is not a final data to be received prior to completing the hash operation;

indicating that the second data is not the final data to be received prior to completing the hash operation; and indicating that the third data is the final data to be received prior to completing the hash operation.

3. The method as recited in claim 1, wherein the first data is prepended to decrypted secure sockets layer (SSL)/transport layer security (TLS) data, the second data is the decrypted SSL/TLS data, and the third data is padding data added to an end of the decrypted SSL/TLS data.

4. The method as recited in claim 1, further comprising: transferring secure sockets layer (SSL)/transport layer security (TLS) data into a linear buffer from scatter buffers; decrypting the SSL/TLS data; and storing decrypted SSL/TLS data in the linear buffer.

5. The method as recited in claim 4, further comprising: transferring the decrypted SSL/TLS data responsive to a read request using a direct memory access (DMA) operation that supports at least up to a 16 KB DMA operation.

6. An apparatus comprising:
a hash message authentication code (HMAC) hardware, wherein the HMAC hardware is configured to:
receive data in separate data transfers to perform a hash operation; receive data of unaligned lengths in the data the HMAC hardware receives, the data of unaligned lengths being smaller than a length of a transfer to the HMAC hardware;
receive a residue indication to indicate to the HMAC hardware a number of bytes in the data of unaligned lengths without data for use by the HMAC hardware, the number of bytes constituting a residue; and
fill in the residue from a subsequent data transfer responsive to the residue indication.

7. The apparatus as recited in claim 6,
wherein the data the HMAC hardware receives includes first data received at a first time;
wherein the data the HMAC hardware receives includes second data received at a second time; and
wherein the data the HMAC hardware receives includes third data received at a third time.

8. The apparatus as recited in claim 7,
wherein the HMAC hardware receives a first type of indication to indicate that the first data is not a final data to be received prior to completing the hash operation;
wherein the HMAC hardware receives the first type of indication to indicate that the second data is not the final data to be received prior to completing the hash operation; and
wherein the HMAC hardware receives a second type of indication indicating that no more data after the third data is to be received prior to completing the hash operation.

9. The apparatus as recited in claim 8, wherein the first data is prepended to decrypted secure sockets layer (SSL)/transport layer security (TLS) data, the second data is the decrypted SSL/TLS data, and the third data is padding data added to an end of the decrypted SSL/TLS data.

10. The apparatus as recited in claim 9, further comprising: a plurality of scatter buffers; and a linear buffer communicatively coupled to the scatter buffers to receive data directly from the scatter buffers.

11. The apparatus as recited in claim 10, wherein the apparatus is responsive to a read request by a host to send decrypted data stored in the linear buffer to the host using a direct memory access (DMA) operation.

12. A system comprising:
a hash message authentication code (HMAC) hardware, wherein the HMAC hardware is configured to:
receive data in separate data transfers to compute a hash for message authentication;
receive data of unaligned lengths in at least one of the separate data transfers, the data of unaligned lengths including a first number of bytes of valid data in a transfer having a second number of bytes, the second number of bytes being greater than the first number of bytes;
receive an indication of a residue indicating a number of bytes without data in the data of unaligned lengths and fill in the residue from a subsequent data transfer responsive to the indication of the residue associated with the data of unaligned lengths; and
receive, for each of the separate data transfers, an indication of whether the data is a final data transfer for computation of the hash or if more data is to be transferred after current data for computation of the hash and compute the hash responsive to the data being the final data transfer.

13. The system as recited in claim 12, further comprising:
a plurality of scatter buffers to store encrypted data that was transferred over a network;
a linear buffer communicatively coupled to the scatter buffers; and
wherein the system is configured to load the linear buffer directly from the scatter buffers.

14. The system as recited in claim 13, wherein the system is responsive to a read request by a host to send decrypted data stored in the linear buffer to the host using a direct memory access (DMA) operation.

\* \* \* \* \*